US008988363B2

(12) United States Patent
Homma et al.

(10) Patent No.: US 8,988,363 B2
(45) Date of Patent: Mar. 24, 2015

(54) INFORMATION PROCESSING APPARATUS, METHOD FOR CONTROLLING DISPLAY, AND COMPUTER-READABLE RECORDING MEDIUM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 529 days.

(21) Appl. No.: 12/795,471

(22) Filed: Jun. 7, 2010

(65) Prior Publication Data

US 2010/0321316 A1 Dec. 23, 2010

(30) Foreign Application Priority Data

Jun. 22, 2009 (JP) .................. P2009-147505

(51) Int. Cl.
*G06F 3/041* (2006.01)
*G06F 3/023* (2006.01)
*G06F 3/0488* (2013.01)

(52) U.S. Cl.
CPC .......... *G06F 3/0235* (2013.01); *G06F 3/04886* (2013.01); *G06F 2203/04808* (2013.01)
USPC .......... 345/173; 345/647; 345/672; 715/764; 715/788

(58) Field of Classification Search
CPC . G06F 3/0488; G06F 3/0481; G06F 3/03547; G06F 3/0482; G06F 3/04845; G06F 3/04847; G06F 3/0486; G06F 9/4443; G06F 17/289; G06F 17/30867; G06F 19/28; G06F 19/322; G06F 19/3406; G06F 19/3431; G06F 19/345; G06F 1/1628; G06F 1/163
USPC ............ 178/18.01–20.04; 715/816, 819, 246, 715/247
See application file for complete search history.

(56) References Cited

U.S. PATENT DOCUMENTS

| 6,073,036 A | * | 6/2000 | Heikkinen et al. .......... 455/550.1 |
| 6,826,729 B1 | * | 11/2004 | Giesen et al. ................. 715/837 |
| 7,571,393 B2 | * | 8/2009 | Premchandran et al. ..... 715/767 |
| 7,710,390 B2 | * | 5/2010 | Tokkonen ..................... 345/156 |
| 2003/0234768 A1 | | 12/2003 | Rekimoto et al. |
| 2004/0210851 A1 | * | 10/2004 | Premchandran et al. ..... 715/851 |
| 2005/0039162 A1 | * | 2/2005 | Cifra ............................. 717/105 |
| 2007/0174788 A1 | * | 7/2007 | Ording ......................... 715/816 |

(Continued)

FOREIGN PATENT DOCUMENTS

JP 3852368 9/2006

*Primary Examiner* — Alexander Eisen
*Assistant Examiner* — Sanjiv D Patel
(74) *Attorney, Agent, or Firm* — Sherr & Jiang, PLLC

(57) ABSTRACT

An information processing apparatus includes: an operation display unit that displays a display screen and detects detection information that changes in accordance with a user operation performed on the display screen; an operation determination unit that determines, in accordance with the detection information, whether an operation has been performed on an operation target displayed on the display screen; a selection unit that selects an image to be displayed, in accordance with a determination result from the operation determination unit; an area-where-arrangement-is-not-to-be-performed setting unit that sets an area where arrangement is not to be performed, in accordance with the determination result from the operation determination unit and the detection information; and an arrangement processing unit that arranges the image to be displayed, in an area where arrangement can be performed, in accordance with the selected image to be displayed and the set area where arrangement is not to be performed.

22 Claims, 8 Drawing Sheets

(56) References Cited

U.S. PATENT DOCUMENTS

| | | | |
|---|---|---|---|
| 2008/0024459 A1* | 1/2008 | Poupyrev et al. | 345/173 |
| 2008/0077871 A1* | 3/2008 | Baar et al. | 715/762 |
| 2008/0136785 A1* | 6/2008 | Baudisch et al. | 345/173 |
| 2008/0186255 A1* | 8/2008 | Cohen et al. | 345/8 |
| 2008/0209309 A1* | 8/2008 | Zhang et al. | 715/205 |
| 2009/0051661 A1* | 2/2009 | Kraft et al. | 345/173 |
| 2009/0122022 A1* | 5/2009 | Park et al. | 345/173 |
| 2010/0026723 A1* | 2/2010 | Nishihara et al. | 345/671 |
| 2010/0088634 A1* | 4/2010 | Tsuruta et al. | 715/800 |
| 2010/0090964 A1* | 4/2010 | Soo et al. | 345/173 |

\* cited by examiner

INFORMATION PROCESSING APPARATUS, METHOD FOR CONTROLLING DISPLAY, AND COMPUTER-READABLE RECORDING MEDIUM

BACKGROUND OF THE INVENTION

1. Field of the Invention

The present invention relates to an information processing apparatus, a method for controlling display, and a computer-readable recording medium.

2. Description of the Related Art

In recent years, information processing apparatuses having a touch screen such as cell phones, video/audio playback apparatuses (video/audio recording/playback apparatuses), and automated-teller machines (ATMs) have been becoming widely used. When an information processing apparatus has a touch screen, a user can operate the information processing apparatus by using a finger or an operation device (for example, a pen-shaped pointing device). Thus, such an information processing apparatus allows a user to perform an operation more intuitively.

In such existing circumstances, technologies for improving the user-friendliness of an information processing apparatus having a touch screen are being developed. An information processing apparatus includes a sensor that detects touching of a surface of the information processing apparatus by an object, the surface being equipped with the sensor and opposite the surface of the information processing apparatus that is equipped with a display panel. A technology for performing processing in accordance with a position that is located on the display panel and that corresponds to a result of detection performed by the sensor is described in, for example, Japanese Unexamined Patent Application Publication No. 2003-330611.

SUMMARY OF THE INVENTION

In a case in which a touch screen is used, when a user operation of touching a display screen (hereinafter the user operation may be called a "touch operation") is performed on, for example, a virtual button displayed on the display screen, a method may be employed in which selection items related to the virtual button are displayed. When the above-described method is employed, the selection items (for example, submenus, other buttons, and the like) may be displayed in such a way that, for example, the selection items are hidden under a user's finger pushing the button. Therefore, there may be a case in which selecting of a selection item hidden under the finger is troublesome for the user.

Here, the touch operation is not necessary in an existing technology for improving the user-friendliness of an information processing apparatus having a touch screen (hereinafter referred to as an "existing technology"). Thus, the occurrence of such a case in which selecting of the above-described selection item is troublesome can be prevented. However, a user who is using an information processing apparatus to which the existing technology has been applied (hereinafter referred to as an "existing information processing apparatus") has to perform operations on the surface of the existing information processing apparatus opposite the surface that is equipped with the display panel, that is, the user has to perform operations on the surface that the user does not directly see. Thus, the existing information processing apparatus loses an advantage of "enabling a user to perform operations more intuitively", and thereby lowering of user-friendliness is unavoidable.

Thus, even when such an existing technology is used, improved user-friendliness for users who use an information processing apparatus including a device that can display a display screen and that allows a user operation to be performed on the display screen does not seem to be provided. An example of such an information processing apparatus is a touch screen or the like.

It is desirable to provide a new and improved information processing apparatus, a new and improved method for controlling display, and a new and improved computer-readable recording medium that can provide improved user-friendliness for users who use an information processing apparatus including a device that can display a display screen and that allows a user operation to be performed on the display screen.

According to an embodiment of the present invention, there is provided an information processing apparatus that includes an operation display unit that displays a display screen and detects detection information that changes in accordance with a user operation performed on the display screen; an operation determination unit that determines, in accordance with the detection information, whether an operation has been performed on an operation target that can be operated by a user and that is displayed on the display screen; an image-to-be-displayed selection unit that selects an image to be displayed that is to be displayed on the display screen, in accordance with a determination result from the operation determination unit; an area-where-arrangement-is-not-to-be-performed setting unit that sets an area where arrangement is not to be performed, the image to be displayed being not to be arranged in the area where arrangement is not to be performed, on the display screen in accordance with the determination result from the operation determination unit and the detection information; and an arrangement processing unit that arranges the image to be displayed, in an area where arrangement can be performed, the image to be displayed being allowed to be arranged in the area where arrangement can be performed, within the display screen in accordance with the selected image to be displayed and the set area where arrangement is not to be performed.

Such a structure can provide improved user-friendliness for users who use an information processing apparatus including a device that can display a display screen and that allows a user operation to be performed on the display screen.

Moreover, the arrangement processing unit may set the area where arrangement can be performed, in accordance with the set area where arrangement is not to be performed and a display area where the image to be displayed can be displayed within the display screen.

Moreover, the area-where-arrangement-is-not-to-be-performed setting unit may update the set area where arrangement is not to be performed, every time an image to be displayed is arranged by the arrangement processing unit, and the arrangement processing unit may set the area where arrangement can be performed, in accordance with the updated area where arrangement is not to be performed.

Moreover, the arrangement processing unit may set a direction of attraction based on the detection information, and a display start position where display of the image to be displayed starts, and may arrange the image to be displayed selected by the image-to-be-displayed selection unit, from the display start position in the direction of attraction.

Moreover, in a case in which the operation determination unit determines that an operation has been performed on a predetermined operation target, the image-to-be-displayed selection unit may select, as the image to be displayed, another operation target that can be operated by a user and that is related to the predetermined operation target.

Moreover, the information processing apparatus may further include a processing unit that performs, in accordance with the determination result from the operation determination unit, processing that corresponds to the operation target, the operation determination unit having determined that an operation has been performed on the operation target.

According to an embodiment of the present invention, there is provided a method for controlling display that includes the steps of: determining, in accordance with detection information detected by an operation determination unit that displays a display screen and detects detection information that changes in accordance with a user operation performed on the display screen, whether an operation has been performed on an operation target that can be operated by a user and that is displayed on the display screen; selecting an image to be displayed that is to be displayed on the display screen, in accordance with a determination result in the step of determining; setting an area where arrangement is not to be performed, the image to be displayed being not to be arranged in the area where arrangement is not to be performed, on the display screen in accordance with the determination result in the step of determining and the detection information; and arranging the image to be displayed, in an area where arrangement can be performed, the image to be displayed being allowed to be arranged in the area where arrangement can be performed, within the display screen in accordance with the image to be displayed selected in the step of selecting and the area where arrangement is not to be performed set in the step of setting.

Such a method can provide improved user-friendliness for users who use an information processing apparatus including a device that can display a display screen and that allows a user operation to be performed on the display screen.

According to an embodiment of the present invention, there is provided a computer-readable recording medium having a program recorded therein, the program that includes the steps of: determining, in accordance with detection information detected by an operation determination unit that displays a display screen and detects detection information that changes in accordance with a user operation performed on the display screen, whether an operation has been performed on an operation target that can be operated by a user and that is displayed on the display screen; selecting an image to be displayed that is to be displayed on the display screen, in accordance with a determination result in the step of determining; setting an area where arrangement is not to be performed, the image to be displayed being not to be arranged in the area where arrangement is not to be performed, on the display screen in accordance with the determination result in the step of determining and the detection information; and arranging the image to be displayed, in an area where arrangement can be performed, the image to be displayed being allowed to be arranged in the area where arrangement can be performed, within the display screen in accordance with the image to be displayed selected in the step of selecting and the area where arrangement is not to be performed set in the step of setting.

Such a computer-readable recording medium can provide improved user-friendliness for users who use an information processing apparatus including a device that can display a display screen and that allows a user operation to be performed on the display screen.

According to the embodiments of the present invention, improved user-friendliness of an information processing apparatus including a device that can display a display screen and that allows a user operation to be performed on the display screen can be provided.

DESCRIPTION OF THE PREFERRED EMBODIMENTS

Figure 1A:
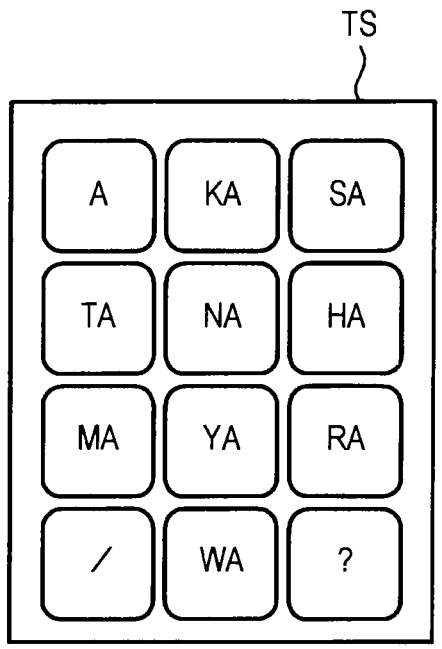
FIG. 1A is a diagram illustrating an approach to improve user-friendliness performed by an information processing apparatus according to an embodiment of the present invention.

In the following, preferred embodiments of the present invention will be specifically described with reference to the attached drawings. Here, elements having substantially the same function and structure are denoted by the same reference numeral in this specification and the drawings, and a redundant description thereof will be omitted.

The following will be described in the order shown below.
1. An Approach According to an Embodiment of the Present Invention
2. An Information Processing Apparatus According to an Embodiment of the Present Invention
3. A Program According to an Embodiment of the Present Invention An Approach According to an Embodiment of the Present Invention Before describing the structure of an information processing apparatus according to an embodiment of the present invention (hereinafter which may be referred to as an "information processing apparatus 100"), an approach to improve user-friendliness according to an embodiment of the present invention will be described.

A Summary of an Approach to Improve User-Friendliness According to an Embodiment of the Present Invention FIGS. 1A to 1D are diagrams illustrating an approach to improve user-friendliness performed by the information processing apparatus 100 according to an embodiment of the present invention.

Here, FIGS. 1A to 1D show an example of a display screen displayed on a touch screen TS. In the example, virtual operation keys (examples of operation targets that can be operated by a user and are displayed on the display screen) for inputting characters are displayed on the display screen. Since the virtual operation keys for inputting characters as shown in FIGS. 1A to 1D are displayed, a user can input a character by pressing a virtual operation key through a user operation performed by, for example, touching the display screen (hereinafter which may be referred to as a "touch operation" or "touching"). In the following, an approach to improve user-friendliness according to an embodiment of the present invention will be described using an example in which virtual operation keys represented by buttons displayed on the display screen of the information processing apparatus 100 as shown in FIGS. 1A to 1D (hereinafter the virtual operation keys may be referred to as "buttons"); however, the approach to improve user-friendliness according to an embodiment of the present invention is not limited thereto. For example, the information processing apparatus 100 may display a virtual operation key which is displayed as an image such as, for example, an icon, and which corresponds to predetermined processing. The information processing apparatus 100 may also display other virtual operation keys that are related to the virtual operation key in response to a touch operation performed on the virtual operation key. Moreover, in display of menus in a nested structure in a case in which a virtual operation key corresponding to a main menu is touched, the information processing apparatus 100 may also display virtual operation keys corresponding to sub-menus.

Figure 1B:
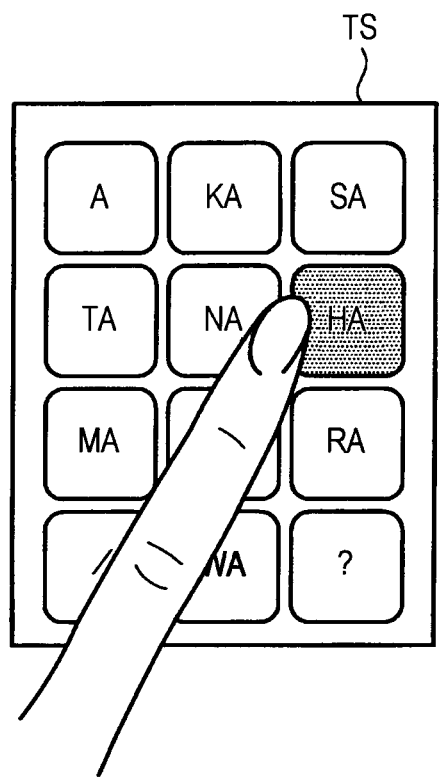
FIG. 1B is a diagram illustrating the approach to improve user-friendliness performed by the information processing apparatus according to the embodiment of the present invention.
Figure 1C:
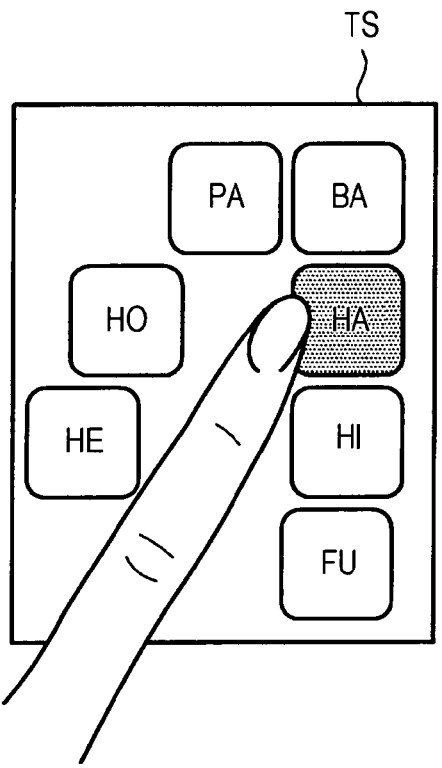
FIG. 1C is a diagram illustrating the approach to improve user-friendliness performed by the information processing apparatus according to the embodiment of the present invention.

When a plurality of buttons mainly representing the top kana characters of columns of Japanese 50-character kana syllabary are displayed on the display screen (FIG. 1A), if a user touches a button corresponding to, for example, a kana character "HA" (FIG. 1B), the information processing apparatus 100 displays virtual operation keys related to the touched button. Here, the information processing apparatus 100 displays the virtual operation keys in such a way that they are not displayed under the finger used to touch the button (FIG. 1C). Here, FIG. 1C illustrates an example in which buttons corresponding to "other kana characters in the HA column" and "kana characters that are related to the kana character "HA" and that have a dull sound or the [p] sound" are displayed; however, the buttons to be displayed are not limited thereto. For example, the information processing apparatus 100 may further display buttons corresponding to "kana characters that are related to other kana characters in the "HA" column and that have a dull sound or the [p] sound".

In the following, like the button corresponding to, for example, the kana character "HA" shown in FIGS. 1A to 1C, a button that causes other virtual operation keys (and/or an object that is displayed in a state that does not allow a user to perform an operation on the object) to be displayed when touched may be called a "parent button". Moreover, in the following, like the buttons corresponding to, for example, the "other kana characters in the HA column" and the "kana characters that are related to the kana character "HA" and that have a dull sound or the [p] sound" shown in FIG. 1C, buttons displayed on the display screen through a touch operation performed on a parent button may be called "child buttons". Here, once a user has touched a "child button" according to an embodiment of the present invention, the "child button" may then also function as a "parent button".

Figure 1D:
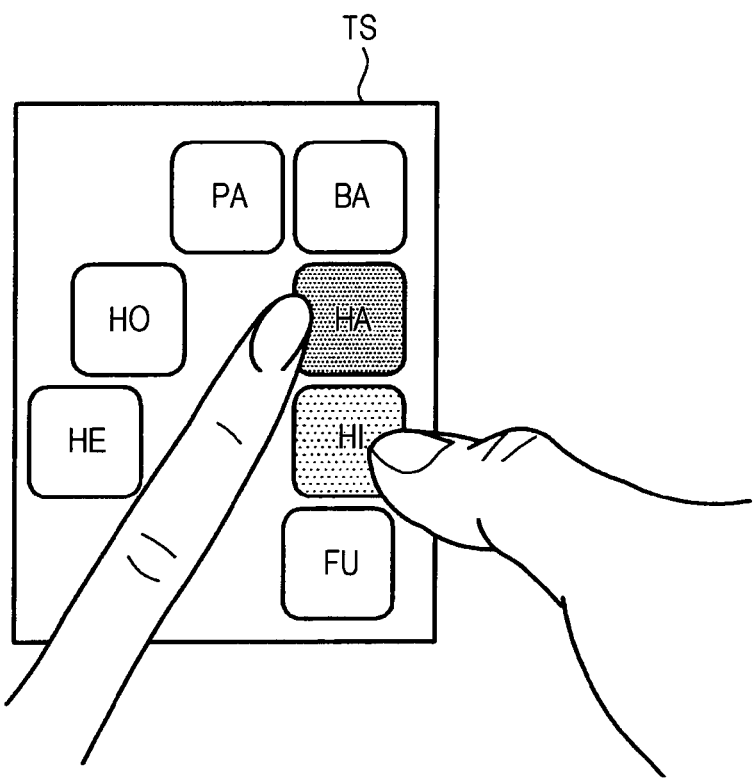
FIG. 1D is a diagram illustrating the approach to improve user-friendliness performed by the information processing apparatus according to the embodiment of the present invention.

For example, as shown in FIG. 1C, the information processing apparatus 100 displays child buttons related to a touched parent button in such a way that the child buttons are not displayed under the user's finger used to touch the parent button. Thus, the child buttons displayed on the display screen are not displayed in such a way that, for example, the child buttons are hidden under the user's finger. The view of the child buttons is not blocked by the user's finger that touched the parent button, so that the user can easily touch a child button (FIG. 1D). Thus, the information processing apparatus 100 can prevent a case in which selection of the above-described options may be troublesome and which may happen in an (existing) information processing apparatus having a touch screen. Thus, the information processing apparatus 100 can improve user-friendliness.

Moreover, as shown in FIGS. 1A to 1D, the information processing apparatus 100 allows a touch operation to be performed on the touch screen TS. Thus, the information processing apparatus 100 still has an advantage of "enabling a user to more intuitively perform an operation" unlike an existing information processing apparatus to which existing technologies have been applied. Thus, the user-friendliness of the information processing apparatus 100 can be improved to be greater than that of the existing information processing apparatus to which existing technologies have been applied.

Thus, the information processing apparatus 100 can provide improved user-friendliness for users who use an information processing apparatus including a device that can display a display screen and that allows a user operation to be performed on the display screen.

A Summary of Processing According to the Approach to Improve User-Friendliness

The following will describe a summary of processing performed by the information processing apparatus 100 in order to realize the above-described approach to improve user-friendliness. The information processing apparatus 100 realizes the approach to improve user-friendliness according to an embodiment of the present invention by performing the following (1) to (4) processing, for example, on a premise shown in (0).

(0) A Premise

The information processing apparatus 100 includes a device, (which is an operation display unit described below) that can display a display screen and allows a user operation to be performed on the display screen and that can detect detection information that changes in accordance with a user operation performed on the display screen. Here, an example of the device is an electrostatic touch screen functioning as, for example, a multi-touch screen; however, the device is not limited thereto.

In a case in which the information processing apparatus 100 includes an electrostatic touch screen, electrostatic sensors are arranged, for example, in a matrix on the display screen. In a case in which, for example, a user brings a finger close to the display screen or touches the display screen, the capacitance between the finger and the electrostatic sensors increases. Thus, the information processing apparatus 100 can detect, as detection information, a value corresponding to a change in capacitance and based on a user operation performed on the display screen.

The following will describe the information processing apparatus 100 as an apparatus that includes, as the device, an electrostatic touch screen, which functions as a multi-touch screen; however, as a matter of course, the device included in an information processing apparatus according to an embodiment of the present invention is not limited to an electrostatic touch screen.

Figure 2:
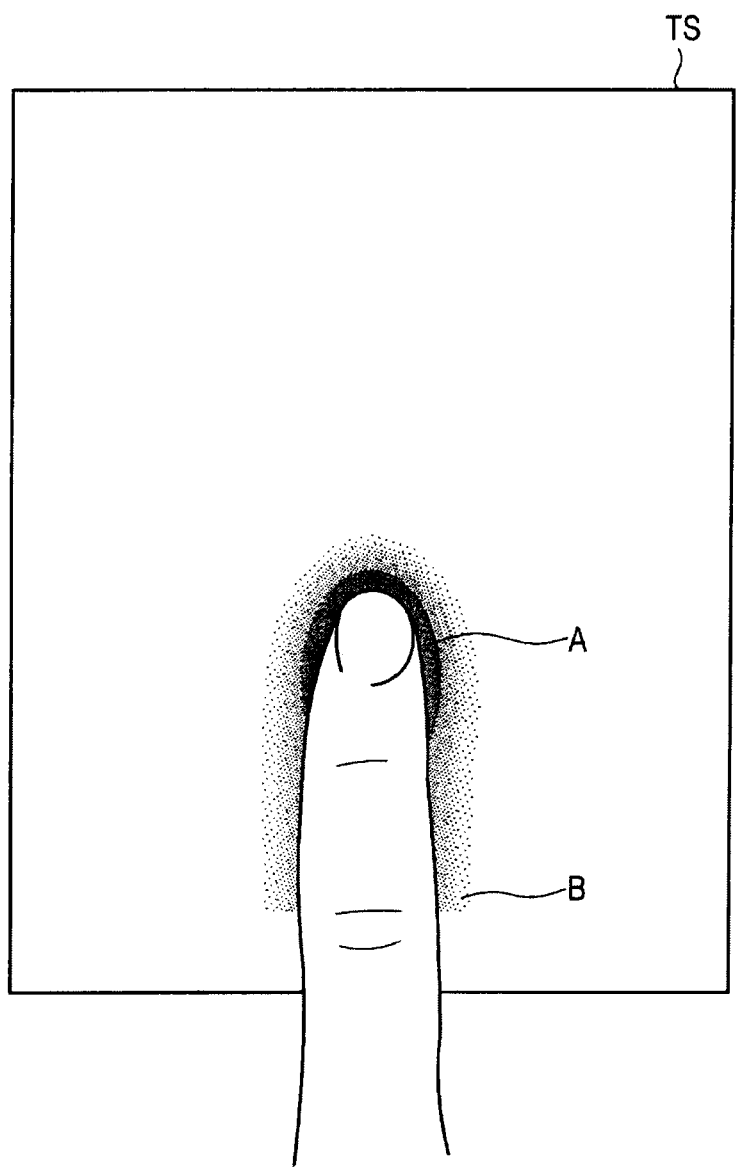
FIG. 2 is a diagram illustrating an example of detection information detected by the information processing apparatus according to an embodiment of the present invention.

FIG. 2 is a diagram illustrating an example of detection information detected by the information processing apparatus 100 according to an embodiment of the present invention. The information processing apparatus 100 detects detection information, which is detected by considering, for example, two major factors including detection information detected in response to a touch operation (A in FIG. 2) and detection information detected when a user's finger approaches the display screen (B in FIG. 2). That is, the information processing apparatus 100 can detect detection information corresponding to the area of the display screen where the user is not directly touching as denoted by, for example, B in FIG. 2.

In the following, detection information detected when the user is directly touching the display screen as denoted by, for example, A in FIG. 2 may be called "first detection information". Moreover, in the following, detection information corresponding to the area of the display screen where the user is not directly touching as denoted by, for example, B in FIG. 2 may be called "second detection information". In a case in which detection information is detected, for example, if the detection information exceeds a predetermined threshold, the information processing apparatus 100 determines that the first detection information is detected. If the detection information is below or equal to the predetermined threshold, the information processing apparatus 100 determines that the second detection information is detected. However, the way of determining whether the first detection information or the second detection information is detected is not limited thereto.

The information processing apparatus 100 realizes display, for example, shown in FIG. 1C by performing the following (1) to (4) processing using the detection information (the first detection information, the second detection information) as shown in FIG. 2. In the following, an operation display unit (described below) of the information processing apparatus 100 detects the detection information.

(1) Processing for Determining Whether an Operation has been Performed on an Operation Target The information processing apparatus 100 determines whether an operation has been performed on an operation target (an operation object), which is displayed on the display screen and can be operated by a user, in accordance with the detected information. Here, examples of operation targets according to an embodiment of the present invention include virtual operation keys represented by buttons, for example, as shown in FIGS. 1A to 1D and a virtual operation key corresponding to display of menus in a nested structure. However, the operation targets are not limited thereto. The following will describe an example in which an operation target according to an embodiment of the present invention is a "virtual operation key".

The information processing apparatus 100 determines whether an operation has been performed on a virtual operation key in accordance with, for example, information regarding the position on the display screen where the virtual operation key is displayed (for example, coordinate information) and information regarding the position on the display screen where the first detection information is detected (for example, information regarding the position of an electrostatic sensor). More specifically, in a case in which, for example, the position of a virtual operation key matches the position where the first detection information is detected, the information processing apparatus 100 determines that an operation has been performed on the operation target. However, the condition used to make a determination is not limited thereto. For example, in a case in which the position where the first detection information is detected is located within a predetermined distance from the position of a virtual operation key, the information processing apparatus 100 may also determine that an operation has been performed on the virtual operation key.

(2) Processing for Selecting Images to be Displayed

In the above-described (1) processing, if it is determined that an operation has been performed on the virtual operation key, the information processing apparatus 100 selects images to be displayed (objects to be displayed) on the display screen.

Here, examples of images to be displayed according to an embodiment of the present invention include other virtual operation keys, each of which is, for example, a child button shown in FIG. 1C, related to the virtual operation key, which has been determined as having had an operation performed thereon. However, the images to be displayed according to an embodiment of the present invention are not limited thereto. For example, the information processing apparatus 100 may also treat, as an image to be displayed, a target (an object) that a user is not allowed to operate. An example of the target that a user is not allowed to operate is, for example, something that displays message information playing a role of mainly conveying information, such as a help message representing explanation of processing allocated to a virtual operation key which has been determined as having had an operation performed thereon. However, the target that a user is not allowed to operate is not limited thereto. For example, in a case in which an action in which a user moves a finger away from the virtual operation key that has been touched by the finger is performed, the information processing apparatus 100 executes processing (described below) allocated to the virtual operation key. In the following, the action in which a user moves a finger away from a touch screen after the user has touched the touch screen may be called "releasing".

The information processing apparatus 100 selects images to be displayed using, for example, a look-up table in which virtual operation keys (operation targets), each of which is related to a corresponding one of pieces of information (for example, information such as a link and a program ID) used to specify images to be displayed. However, the way of selecting images to be displayed is not limited thereto.

(3) Processing for Setting an Area where Arrangement is not to be Performed

The information processing apparatus 100 sets, in accordance with results of the above-described (1) processing and the detected detection information, an area where arrangement is not to be performed, images to be displayed being not to be arranged in the area where arrangement is not to be performed and the area where arrangement is not to be performed being included in the display screen. More specifically, in a case in which it is determined that an operation has been performed on an operation target in the above-described (1) processing, the information processing apparatus 100 sets, in accordance with the detected detection information, an area where arrangement is not to be performed, images to be displayed being not to be arranged in the area where arrangement is not to be performed and the area where arrangement is not to be performed being included in the display screen.

Figure 3A:
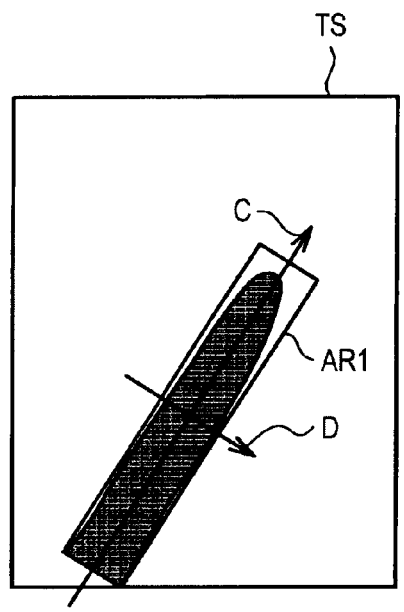
FIG. 3A is a diagram showing an example of an area where arrangement is not to be performed based on detection information according to an embodiment of the present invention.
Figure 3B:
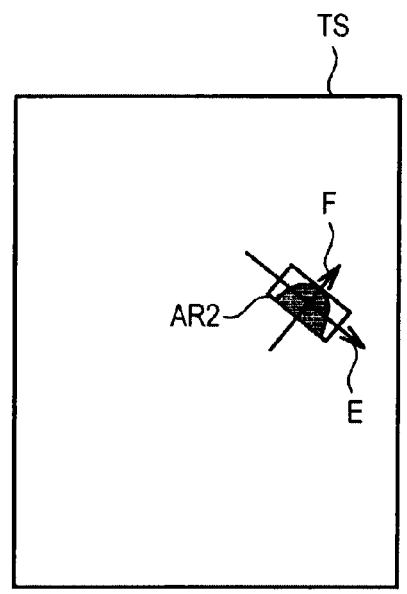
FIG. 3B is a diagram showing an example of an area where arrangement is not to be performed based on detection information according to an embodiment of the present invention.

FIGS. 3A and 3B are diagrams illustrating an example of an area where arrangement is not to be performed using detection information according to an embodiment of the present invention. In accordance with, for example, the detected detection information (the first detection information, the second detection information), the information processing apparatus 100 sets an rectangular area including the detection information as the area where arrangement is not to be performed. FIG. 3A shows an example in which the information processing apparatus 100 sets an area AR1 as the area where arrangement is not to be performed, and FIG. 3B shows an example in which the information processing apparatus 100 sets an area AR2 as the area where arrangement is not to be performed.

Here, the information processing apparatus 100 obtains the length, the thickness, and the angle of a finger from the distribution of capacitance by applying, for example, a method such as a method using an oriented bounding box to a binary image of the shape of a finger detected in accordance with detection information. The information processing apparatus 100 sets an area where arrangement is not to be performed based on the detection information. However, the way of setting the area where arrangement is not to be performed is not limited thereto.

Moreover, the information processing apparatus 100 uses information regarding the longer side (for example, C shown in FIGS. 3A and E shown in FIG. 3B) of the set area where arrangement is not to be performed based on the detection information and information regarding the shorter side (for example, D shown in FIGS. 3A and F shown in FIG. 3B) of the set area, in the below-described (4) processing (described below).

The information processing apparatus 100 sets, as an initial area where arrangement is not to be performed, an area obtained by adding the area where arrangement is not to be performed based on the detection information and an area where a virtual operation key (an operation target such as a parent button) that is used to select images to be displayed is arranged.

Moreover, in a case in which arrangement of images to be displayed starts in the below-described (4) processing, the information processing apparatus 100 updates the set area where arrangement is not to be performed, every time an image to be displayed is arranged. More specifically, the information processing apparatus 100 updates the area where arrangement is not to be performed by, for example, adding the area where an image to be displayed is arranged to the area where arrangement is not to be performed.

In (3) processing, the information processing apparatus 100 sets the area where arrangement is not to be performed, in accordance with the results of the above-described (1) processing and the detection information. As a result, for example, a child button can be prevented from being displayed under the user's finger that has touched the parent button. Moreover, the information processing apparatus 100 can prevent a plurality of images to be displayed from being displayed in an overlapping manner by updating the area where arrangement is not to be performed.

(4) Arrangement Processing

The information processing apparatus 100 arranges images to be displayed, in an area where arrangement can be performed, images to be displayed being allowed to be arranged in the area where arrangement can be performed, within the display screen in accordance with the images to be displayed selected in the above-described (2) processing and the area where arrangement is not to be performed set in the above-described (3) processing. Here, (4) processing corresponds to processing for changing the layout of the display screen.

More specifically, for each of the images to be displayed selected in the above-described (2) processing, the information processing apparatus 100 arranges the image to be displayed in the area where arrangement can be performed by performing, for example, (4-1) processing and (4-2) processing.

(4-1) Processing for Setting an Area where Arrangement can be Performed

The information processing apparatus 100 sets an area where arrangement can be performed, in accordance with information regarding a display area and information regarding the area where arrangement is not to be performed. Here, the information regarding a display area according to an embodiment of the present invention is information indicating an area within the display screen where operation targets, images to be displayed, and the like according to the approach to improve user-friendliness can be displayed. Examples of the display area according to an embodiment of the present invention include, for example, the entire area of the display screen and a predetermined area within the display screen; however, the display area is not limited thereto. For example, the information processing apparatus 100 may also set, as the display area, an arbitrary area within the display screen in accordance with a user operation.

More specifically, the information processing apparatus 100 specifies a display area by reading, for example, display area data stored in a storage unit (described below) and sets an area obtained by excluding the area where arrangement is not to be performed from the display area as the area where arrangement can be performed; however, the way of setting the area where arrangement can be performed is not limited thereto.

(4-2) Processing for Arranging Images to be Displayed

When the area where arrangement can be performed is set in the above-described (4-1) processing, the information processing apparatus 100 arranges, in the area where arrangement can be performed, the images to be displayed selected in the above-described (2) processing.

The information processing apparatus 100 realizes processing for arranging images to be displayed by performing arrangement using, for example, physical calculation which causes the images to be displayed to fall in the direction of attraction from an arrangement start position on the display screen; however, the way of realizing processing for arranging images to be displayed is not limited thereto. The information processing apparatus 100 may arrange images to be displayed, in a predetermined arrangement order from a predetermined start position of the area where arrangement can be performed. For example, the information processing apparatus 100 may also arrange images to be displayed in a matrix starting from the upper-left end of the area where arrangement can be performed.

A Specific Example of Processing for Arranging Images to be Displayed

Processing for arranging images to be displayed according to an embodiment of the present invention will be more specifically described using, as an example, a case in which the images to be displayed are arranged using physical calculation. The information processing apparatus 100 realizes arrangement of the images to be displayed using physical calculation by performing, for example, the following (a) to (c) processing. Here, after the (a) and (b) processing are performed once from among the following (a) to (c) processing in arrangement of the images to be displayed selected in the above-described (2) processing, the information processing apparatus 100 can skip the (a) and (b) processing in the arrangement of the images to be displayed.

(a) Setting of the Direction of Attraction on the Display Screen

The information processing apparatus 100 determines whether, for example, the size of the area where arrangement is not to be performed set in the above-described (3) processing is larger than a predetermined size (or larger than and equal to the predetermined size. Hereinafter this condition is similarly applied to where a determination is made). Then, the information processing apparatus 100 sets the direction of attraction in accordance with a result of the determination and information regarding the direction of the longer side of the set area where arrangement is not to be performed and information regarding the direction of the shorter side of the set area where arrangement is not to be performed. The following uses, as examples, the area AR1 where arrangement is not to be performed shown in FIG. 3A and the area AR2 where arrangement is not to be performed shown in FIG. 3B. In the following, the area AR1 where arrangement is not to be performed is larger than the predetermined size and the area AR2 where arrangement is not to be performed is smaller than or equal to the predetermined size.

In a case in which, for example, the area AR1 where arrangement is not to be performed shown in FIG. 3A is set, the information processing apparatus 100 determines the shorter side of the set area AR1 where arrangement is not to be performed to be the thickness of a finger and the longer side thereof to be the length of the finger, and sets the direction of the longer side as the direction of attraction. Here, the information processing apparatus 100 sets, for example, a predefined direction on the display screen (for example, a direction that is directed upward on the display screen) from among directions parallel to the longer side of the set area AR1 where arrangement is not to be performed, as the direction of the longer side of the area AR1 where arrangement is not to be performed; however, the way of setting the direction of attraction is not limited thereto. In a case in which a set area where arrangement is not to be performed is larger than a predetermined size, for example, like the area AR1 where arrangement is not to be performed shown in FIG. 3A, the information processing apparatus 100 can display images to be displayed in a more concentrated manner in the direction toward the tip of the user's finger by setting the direction of the longer side of the set area where arrangement is not to be performed as the direction of attraction.

Moreover, for example, in a case in which the area AR2 where arrangement is not to be performed shown in FIG. 3B is set, the information processing apparatus 100 determines the longer side of the set area AR2 where arrangement is not to be performed to be the thickness of a finger and the shorter side thereof to be the length of the finger, and sets the direction of the shorter side as the direction of attraction. Here, the information processing apparatus 100 sets, for example, a predefined direction on the display screen (for example, a direction that is directed upward on the display screen) from among directions parallel to the shorter side of the set area AR2 where arrangement is not to be performed, as the direction of the shorter side of the area AR2 where arrangement is not to be performed; however, the way of setting the direction of attraction is not limited thereto. Here, an example of a case in which a set area where arrangement is not to be performed is smaller than a predetermined size, for example, like the area AR2 where arrangement is not to be performed shown in FIG. 3B is a case in which, for example, a user has performed touching using the tip of a finger. In the above-described case, relationships between the shorter and longer sides of the area where arrangement is not to be performed and the thickness and length of the user's finger are different from the relationships shown in FIG. 3A. Thus, in a case in which the size of the set area where arrangement is not to be performed is smaller than the predetermined size, the information processing apparatus 100 can increase the probability of realizing display in which images to be displayed are displayed in a more concentrated manner in the direction away from the user, by setting the direction of the shorter side of the set area where arrangement is not to be performed as the direction of attraction.

(b) Setting of an Arrangement Start Position

If the direction of attraction is set in the above-described (a) processing, the information processing apparatus 100 sets an arrangement start position at which arrangement of images to be displayed starts.

Here, the information processing apparatus 100 may set, as the arrangement start position, the position where, for example, a virtual operation key (an operation target such as a parent button) used to select images to be displayed was displayed; however, the position is not limited thereto. For example, the information processing apparatus 100 may also set, as the display start position, an intersection in the direction opposite the direction of attraction from among intersections of a straight line parallel to the direction of attraction and passing through the center of the area where arrangement is not to be performed and the display area.

(c) Arrangement Based on Physical Calculation in the Direction of Attraction from the Arrangement Start Position If the direction of attraction and the arrangement start position are set in the above-described (a) processing and the above-described (b) processing, the information processing apparatus 100 arranges, in the direction of attraction from the arrangement start position, images to be displayed in the area where arrangement can be performed, by performing physical calculation.

Here, the information processing apparatus 100 realizes arrangement based on physical calculation by, for example, incorporating information regarding the area where arrangement can be performed, information regarding the direction of attraction, and information regarding the arrangement start position into a physical space of a physics engine; however, the way of realizing arrangement based on physical calculation is not limited thereto. For example, the information processing apparatus 100 may also realize arrangement based on physical calculation by incorporating information regarding the display area, information regarding the area where arrangement is not to be performed, information regarding the direction of attraction, and information regarding the arrangement start position into a physical space of a physics engine. In the above-described case, the above-described (4-1) processing (processing for setting an area where arrangement can be performed) and the above-described (4-2) processing are realized as a single processing (a series of processing).

As described above, by performing arrangement based on physical calculation, the information processing apparatus 100 can arrange images to be displayed in an open space in the area where arrangement can be performed while, for example, colliding the images to be displayed and the contact shape of a finger, a parent button (for example, a button representing the top kana character of a column), the frame of the screen, and the like.

Figure 4:
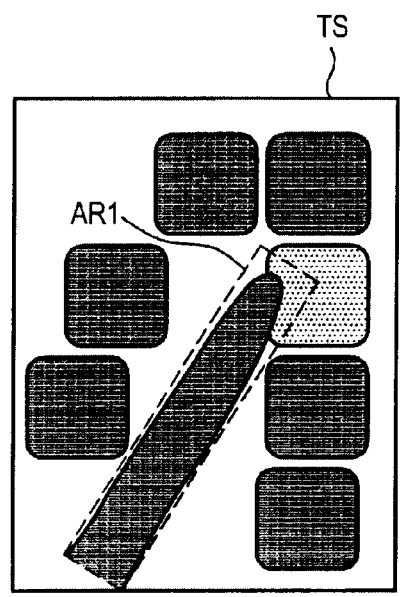
FIG. 4 is a diagram showing an example of a result of arrangement processing performed by the information processing apparatus according to an embodiment of the present invention.

The information processing apparatus 100 arranges images to be displayed using physical calculation by performing, for example, the above-described (a) to (c) processing. Thus, the information processing apparatus 100 can redesign the layout of the display screen in such a way that, for example, the contact shape of the finger, the parent button touched by the user, the frame of the screen, and each of the images to be displayed (for example, child buttons) are not overlapped with each other as shown in FIG. 4. Here, FIG. 4 is a diagram illustrating an example of a result of arrangement processing performed by the information processing apparatus 100 according to an embodiment of the present invention, and shows a state corresponding to FIG. 1C.

Here, processing for arranging images to be displayed performed by the information processing apparatus 100 according to an embodiment of the present invention is not limited to the above-described (a) to (c) processing. For example, in a case in which the information processing apparatus 100 arranges an image to be displayed, if an area necessary for arranging the image to be displayed is larger than the area where arrangement can be performed, the information processing apparatus 100 may also adjust the display size (the size of the area) of an image to be displayed that has been arranged and/or that of the image to be displayed. By adjusting the display size of the image to be displayed that has been arranged and/or that of the image to be displayed as described above, display according to the approach to improve user-friendliness according to an embodiment of the present invention can be realized while a case in which, for example, an image to be displayed is not displayed is prevented from occurring.

The information processing apparatus 100 can realize "display in which a child button related to a parent button is displayed in such a way that the child button is not displayed under the finger used to touch the parent button" as shown in, for example, FIG. 1C by performing, for example, the above-described (1) to (4) processing. Thus, the information processing apparatus 100 can provide improved user-friendliness for users who use an information processing apparatus including a device that can display a display screen and that allows a user operation to be performed on the display screen, by performing, for example, the above-described (1) to (4) processing.

Figure 5:
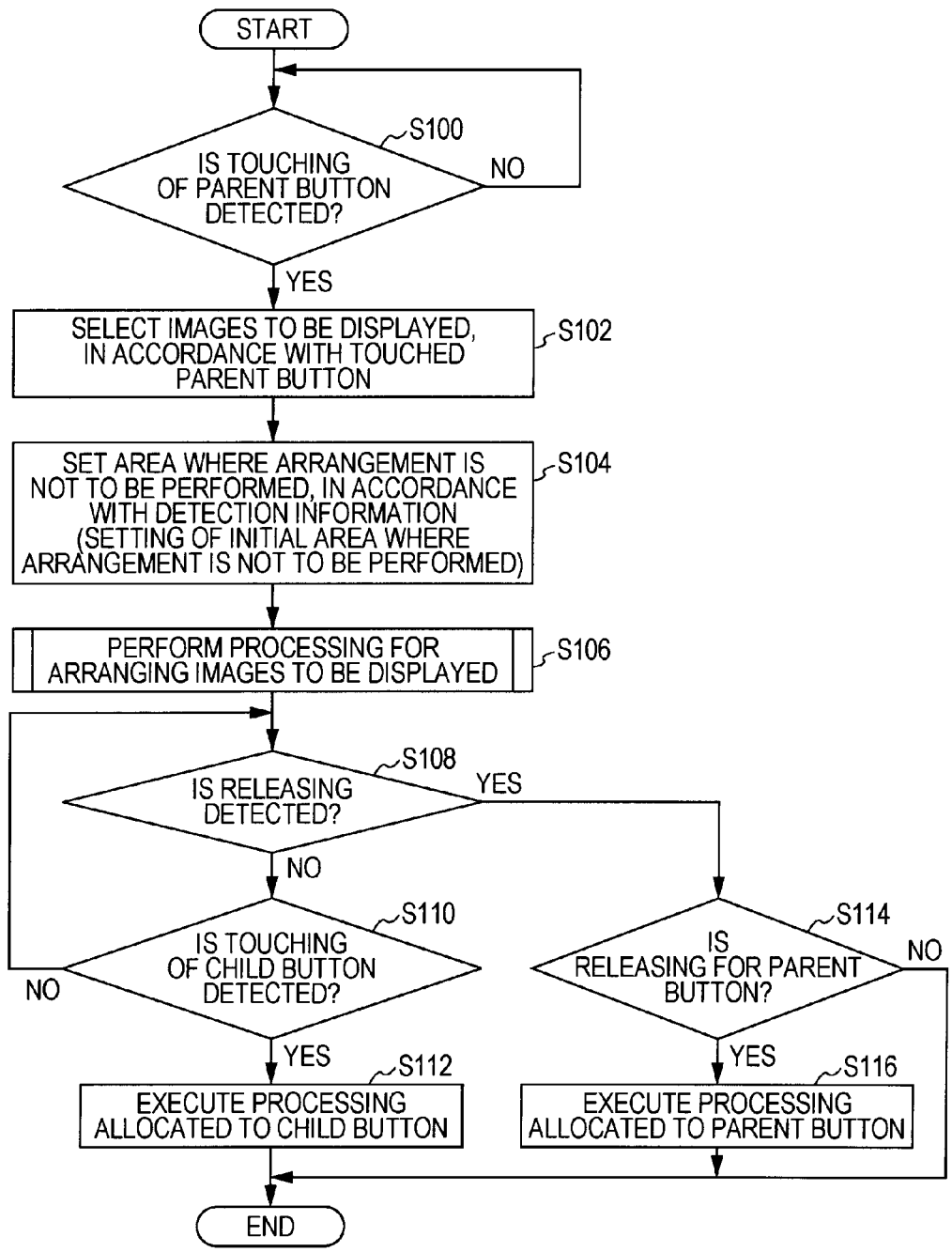
FIG. 5 is a flowchart showing an example of processing according to an approach to improve user-friendliness performed by the information processing apparatus according to an embodiment of the present invention.

A Specific Example of Processing According to the Approach to Improve User-Friendliness According to an Embodiment of the Present Invention Next, processing according to the approach to improve user-friendliness performed by the information processing apparatus 100 according to an embodiment of the present invention will be more specifically described. FIG. 5 is a flowchart showing an example of processing according to the approach to improve user-friendliness performed by the information processing apparatus 100 according to an embodiment of the present invention. Here, FIG. 5 shows an example of processing performed in a case in which the information processing apparatus 100 displays child buttons in response to a touch operation performed on the parent button, as shown in FIGS. 1A to 1D. Here, as a matter of course, such parent and child buttons may be replaced with various display forms. For example, the parent button and child buttons shown in FIG. 5 may be replaced with, for example, a virtual operation key corresponding to a main menu and virtual operation keys corresponding to sub-menus, respectively, when menus are displayed in a nested structure.

The information processing apparatus 100 determines whether touching of the parent button is detected (step S100). Here, the information processing apparatus 100 makes a determination in step S100 in accordance with, for example, information regarding the position on the display screen where the parent button is displayed and information regarding the position on the display screen where the first detection information is detected. However, the information processing apparatus 100 may make a determination in step S100 in accordance with other information. Processing in step S100 corresponds to the above-described (1) processing (processing for determining whether an operation has been performed on an operation target).

In step S100, if it is determined that touching of the parent button is not detected, the information processing apparatus 100 stops processing until touching of the parent button is detected.

Moreover, in step S100, if it is determined that touching of the parent button is detected, the information processing apparatus 100 selects images to be displayed in accordance with the touched parent button (step S102). Here, the information processing apparatus 100 selects the images to be displayed using, for example, a look-up table in which the parent button is related to information for specifying the images to be displayed (for example, information such as a link and a program ID). However, the information processing apparatus 100 may select images to be displayed using something else. Processing in step S102 corresponds to the above-described (2) processing (processing for selecting images to be displayed).

Moreover, the information processing apparatus 100 sets an area where arrangement is not to be performed, in accordance with detection information regarding touching (step S104; setting of an initial area where arrangement is not to be performed). Here, the information processing apparatus 100 sets, for example, an area obtained by adding an area where arrangement is not to be performed based on detection information calculated using a method such as a method using an oriented bounding box and an area where the parent button is arranged, as the area where arrangement is not to be performed (the initial area where arrangement is not to be performed). However, the area to be set as the area where arrangement is not to be performed (the initial area where arrangement is not to be performed) is not limited thereto. Processing in step S104 corresponds to the above-described (3) processing (processing for setting an area where arrangement is not to be performed).

Here, FIG. 5 shows an example in which the information processing apparatus 100 performs processing in step S102, and then performs processing in step S104. However, the order of processing is not limited thereto. For example, the information processing apparatus 100 may also perform processing in step S102 and processing in step S104 independently. In the above-described case, the information processing apparatus 100 may perform processing in step S104 and then processing in step S102, or the information processing apparatus 100 may also perform processing in step S104 in synchronization with the start of processing in step S102.

After the images to be displayed and the area where arrangement is not to be performed are set in steps S102 and S104, the information processing apparatus 100 performs processing for arranging the images to be displayed (step S106). Here, the information processing apparatus 100 arranges the images to be displayed using, for example, physical calculation utilizing a physics engine. However, the information processing apparatus 100 may arrange the images to be displayed using something else. Processing in step S106 corresponds to the above-described (4) processing (arrangement processing).

An Example of Processing for Arranging Images to be Displayed

Figure 6:
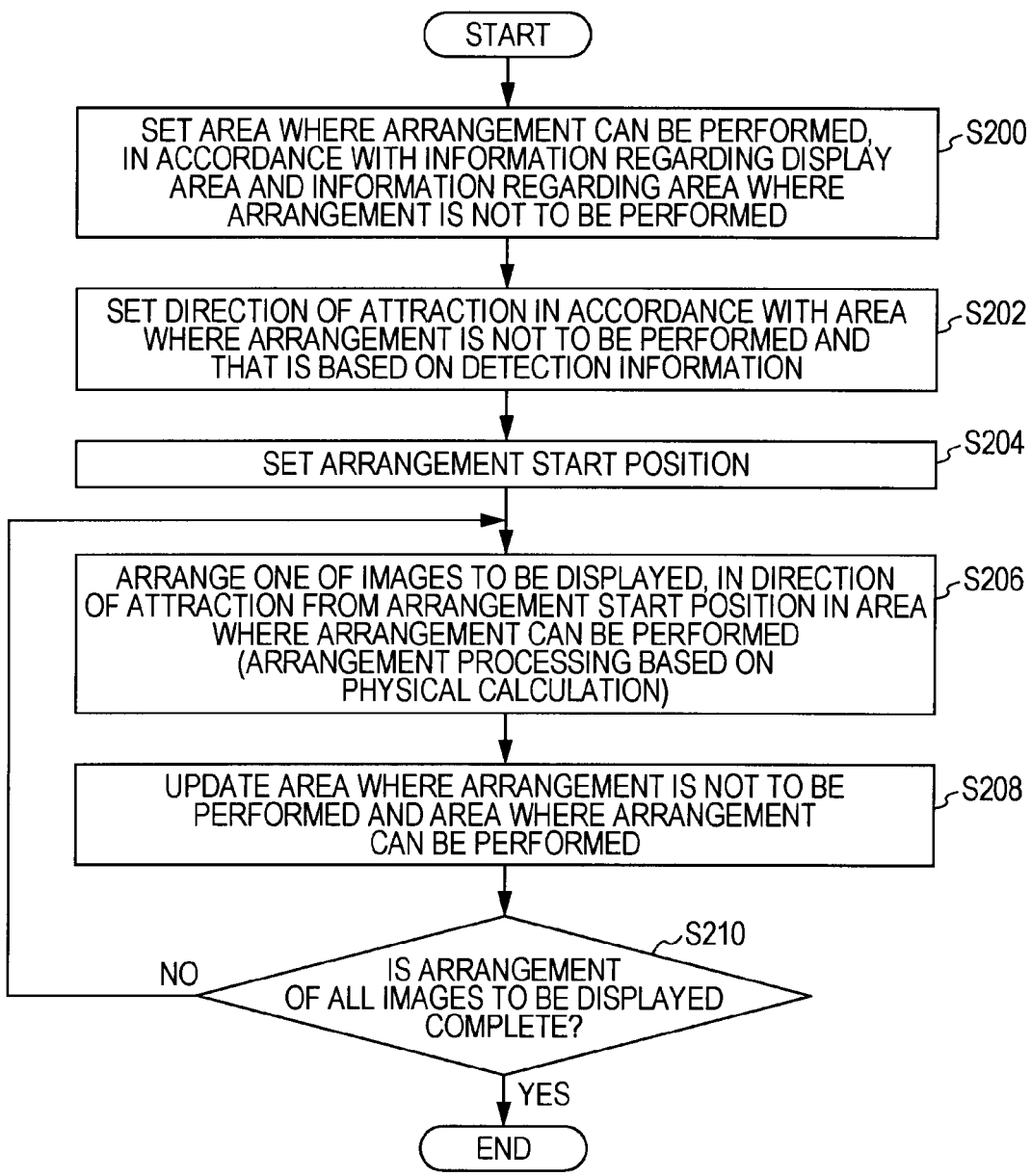
FIG. 6 is a flowchart showing an example of processing for arranging images to be displayed, the processing being performed by the information processing apparatus according to an embodiment of the present invention.

FIG. 6 is a flowchart showing an example of processing for arranging images to be displayed performed in the information processing apparatus 100 according to an embodiment of the present invention. Here, FIG. 6 shows an example of arrangement processing in a case in which the information processing apparatus 100 arranges the images to be displayed using physical calculation.

The information processing apparatus 100 sets an area where arrangement can be performed, in accordance with information regarding a display area and information regarding the area where arrangement is not to be performed (step S200). Here, the information processing apparatus 100 specifies the display area by reading, for example, display area data stored in the storage unit (described later) and sets an area obtained by excluding the area where arrangement is not to be performed from the display area as the area where arrangement can be performed. However, the way of setting the area where arrangement can be performed is not limited thereto.

The information processing apparatus 100 sets the direction of attraction (step S202) in accordance with the area where arrangement is not to be performed based on the detection information (for example, the area AR1 where arrangement is not to be performed shown in FIG. 3A and the area AR2 where arrangement is not to be performed shown in FIG. 3B), and sets an arrangement start position (step S204).

Here, FIG. 6 shows an example in which the information processing apparatus 100 performs processing in step S200 and then performs processing in steps S202 and S204. However, the order of processing is not limited thereto. For example, the information processing apparatus 100 may also perform processing in step S200 and processing in steps S202 and S204 independently. Moreover, the information processing apparatus 100 may perform processing in step S202 and processing in step S204 independently in a case in which the arrangement start position is not set in accordance with the set direction of attraction.

The information processing apparatus 100 arranges one of the images to be displayed and arranged, in the direction of attraction from the arrangement start position in the area where arrangement can be performed (step S206; arrangement processing based on physical calculation). Here, the information processing apparatus 100 may arrange the images to be displayed selected in processing in step S102 shown in FIG. 5, for example, in a predetermined order or may also arrange them in a random order. However, the order of arrangement is not limited thereto.

If the one of the images to be displayed is arranged in step S206, the information processing apparatus 100 updates the area where arrangement is not to be performed and the area where arrangement can be performed (step S208). Even in a case in which a plurality of images to be displayed are displayed on the display screen, the information processing apparatus 100 can prevent the images to be displayed from, for example, being displayed in an overlapping manner by performing processing in step S208.

If the area where arrangement is not to be performed and the area where arrangement can be performed are updated in step S208, the information processing apparatus 100 determines whether display of all the images to be displayed is complete (step S210). Here, the information processing apparatus 100 makes a determination in step S210 by, for example, incrementing the value of a counter every time arrangement of one of the images to be displayed is complete and comparing the value of the counter with a value corresponding to the number of the images to be displayed. However, the way of making a determination in step S210 is not limited thereto. For example, the information processing apparatus 100 may determine that display of all the images to be displayed is complete in a case in which the value of the counter matches a value corresponding to the number of the images to be displayed.

If it is determined that display of all the images to be displayed is yet not complete in step S210, the information processing apparatus 100 repeats processing from processing in step S206. If it is determined that display of all the images to be displayed is complete in step S210, the information processing apparatus 100 terminates arrangement processing.

The information processing apparatus 100 can realize the above-described (4) processing (arrangement processing) according to the approach to improve user-friendliness by performing, for example, processing shown in FIG. 6. Here, as a matter of course, arrangement processing performed by the information processing apparatus 100 according to an embodiment of the present invention is not limited to the processing shown in FIG. 6.

The (1) processing (processing for determining whether an operation has been performed on an operation target) to the (4) processing (arrangement processing) according to the approach to improve user-friendliness are realized by processing in steps S100 to S106 shown in FIG. 5. Thus, the information processing apparatus 100 can provide improved user-friendliness for users who use an information processing apparatus including a device that can display a display screen and that allows a user operation to be performed on the display screen, by performing processing in steps S100 to S106.

Moreover, as shown in FIG. 1D, a user can further perform an operation on the display screen (whose layout is changed), which is displayed through the approach to improve user-friendliness. The following will describe using FIG. 5 an example of processing to be performed by the information processing apparatus 100 in a case in which a user performs an operation on the display screen.

If arrangement processing is complete in step s106, the information processing apparatus 100 determines whether releasing is detected (step S108). The information processing apparatus 100 can make a determination in step S108 by, for example, detecting a change in value of the electrostatic sensors of the touch screen.

If it is determined that releasing is not detected in step S108, the information processing apparatus 100 determines whether touching of a child button is detected (step S110). Here, the information processing apparatus 100 makes a determination in step S110 in accordance with, for example, information regarding the position on the display screen where a child button is displayed and information regarding the position on the display screen where the first detection information is detected. However, the information used to make a determination in step S110 is not limited thereto.

If it is determined that touching of a child button is not detected in step S110, the information processing apparatus 100 repeats processing in and after step S108.

If it is determined that touching of a child button is detected in step S110, the information processing apparatus 100 executes processing allocated to the touched child button (step S112). Here, an example of processing allocated to the child button in step S112 is processing for, for example, inputting a kana character corresponding to the child button or the like. However, the processing allocated to the child button is not limited thereto. For example, in a case in which there is another virtual operation key related to the touched child button, the information processing apparatus 100 can perform processing in and after step S102 by, for example, treating the child button as a new parent button.

If it is determined that releasing is detected in step S108, the information processing apparatus 100 determines whether the detected releasing is releasing of the parent button (step S114). Here, the information processing apparatus 100 makes a determination in step S114 in accordance with, for example, a change in value of the electrostatic sensors of the touch screen and the position where the change is detected (the position of an electrostatic sensor). However, the information used to make a determination in step S114 is not limited thereto.

If it is determined that releasing detected in step S114 is releasing of the parent button, the information processing apparatus 100 executes processing allocated to the parent button (step S116). Here, an example of processing allocated to the parent button in step S116 is processing for, for example, inputting a kana character corresponding to the parent button or the like. However, the processing allocated to the parent button is not limited thereto.

If it is determined that releasing detected in step S114 is not releasing of the parent button, the information processing apparatus 100 terminates processing.

When a user performs an operation on the display screen, the information processing apparatus 100 can perform processing corresponding to the operation by performing processing in steps S108 to S116 shown in FIG. 5. Here, as a matter of course, the processing performed by the information processing apparatus 100 in a case in which a user performs an operation on the display screen is not limited to processing in steps S108 to S116 shown in FIG. 5.

An Information Processing Apparatus According to an Embodiment of the Present Invention Next, an exemplary structure of the information processing apparatus 100 according to an embodiment of the present invention will be described. The information processing apparatus 100 can realize the approach to improve user-friendliness according to the above-described embodiment of the present invention.

Figure 7:
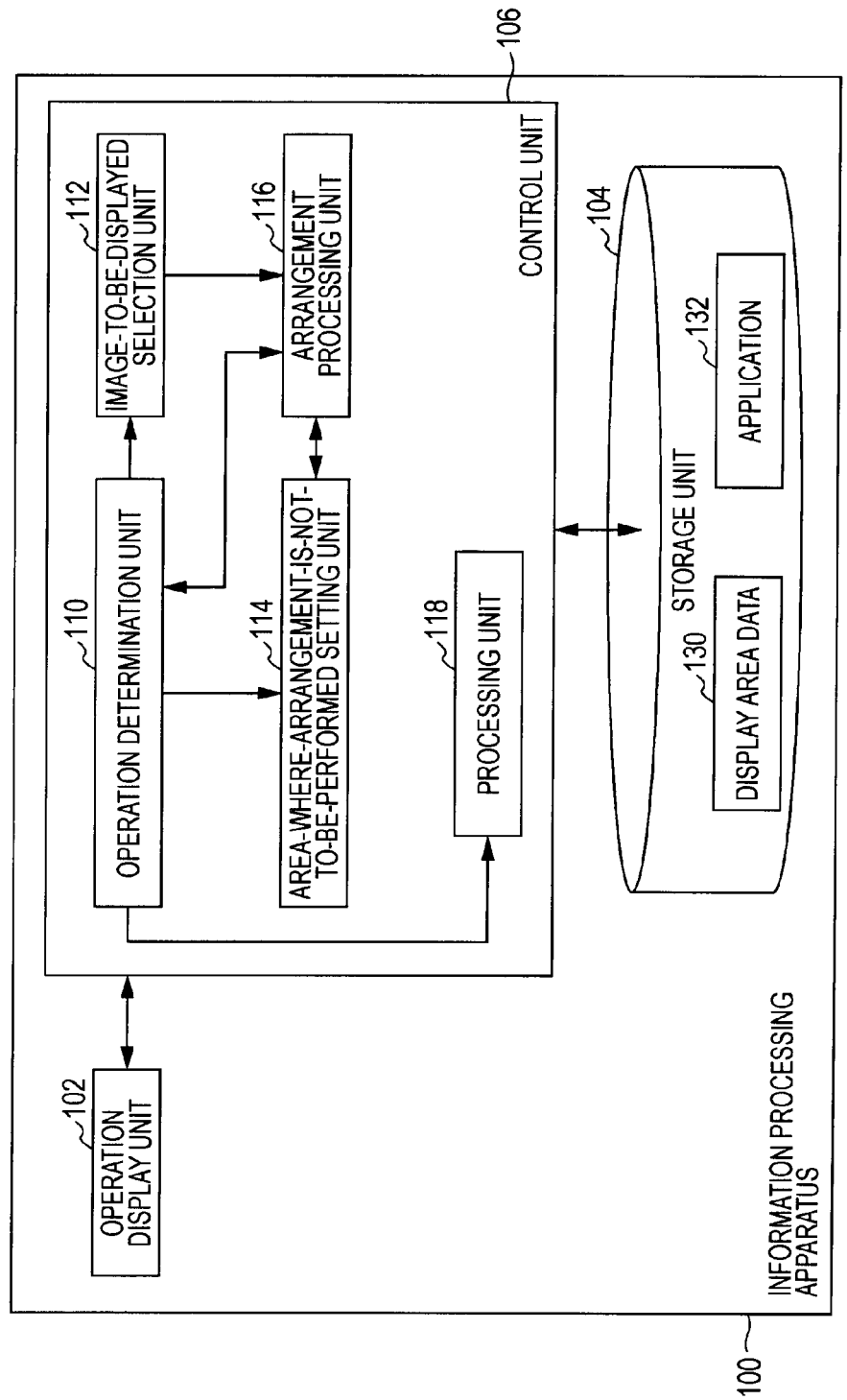
FIG. 7 is a diagram showing an example of the structure of the information processing apparatus according to an embodiment of the present invention.

FIG. 7 is a diagram showing an example of the structure of the information processing apparatus 100 according to an embodiment of the present invention. The information processing apparatus 100 includes an operation display unit 102, a storage unit 104, and a control unit 106.

Moreover, the information processing apparatus 100 may also include, for example, a read-only memory (ROM), which is not shown, a random access memory (RAM), which is not shown, a communication unit (not shown), and an operation unit (not shown) that a user can operate. In the information processing apparatus 100, for example, a bus as a data transmission line is used to connect the components.

Here, the ROM (not shown) stores programs to be used by the control unit 106 and data for control such as calculation parameters. The RAM (not shown) is a primary storage for storing programs to be executed by the control unit 106. An example of the operation unit (not shown) is, for example, a device for inputting an operation, which will be described later. The communication unit (not shown) plays a role of performing communication via a network (or directly) to and from an external apparatus in a wired or wireless manner. Here, examples of the network include wired networks such as a local area network (LAN) and a wide area network (WAN), wireless networks such as a wireless wide area network (WWAN) and a wireless metropolitan area network (WMAN), and the Internet using communications protocol such as transmission control protocol/internet protocol (TCP/IP). However, the examples of the network are not limited thereto. Moreover, an example of the communication unit (not shown) is, for example, a communication interface, which will be described later.

An Exemplary Hardware Structure of the Information Processing Apparatus 100

Figure 8:
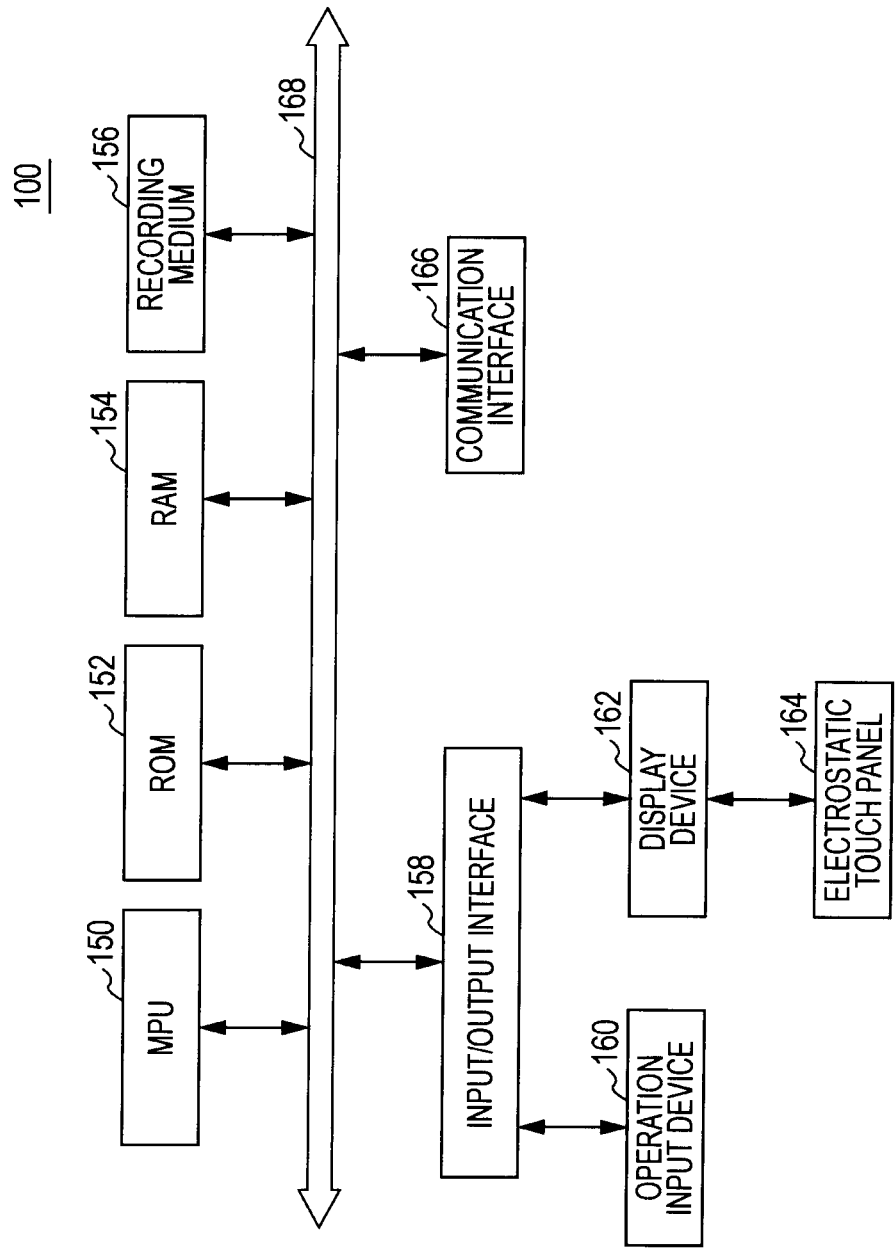
FIG. 8 is a diagram showing an example of a hardware structure of the information processing apparatus according to an embodiment of the present invention.

FIG. 8 is a diagram showing an example of a hardware structure of the information processing apparatus 100 according to an embodiment of the present invention. In FIG. 8, the information processing apparatus 100 includes, for example, a microprocessor unit (MPU) 150, a ROM 152, a RAM 154, a recording medium 156, an input/output interface 158, an operation input device 160, a display device 162, an electrostatic touch panel 164, and a communication interface 166. In the information processing apparatus 100, for example, a bus 168 as a data transmission line is used to connect the components.

The MPU 150 includes a MPU and an integrated circuit on which a plurality of circuits for realizing a control function are integrated. The MPU 150 functions as the control unit 106 that controls the whole information processing apparatus 100. Moreover, the MPU 150 can also function as an operation determination unit 110, an image-to-be-displayed selection unit 112, an area-where-arrangement-is-not-to-be-performed setting unit 114, an arrangement processing unit 116, and a processing unit 118 in the information processing apparatus 100.

The ROM 152 stores programs to be used by the MPU 150 and data for control such as calculation parameters. The RAM 154 is a primary storage for storing, for example, programs to be executed by the MPU 150 and the like.

The recording medium 156 functions as the storage unit 104, and stores, for example, various data such as display area data, content data, and various applications such as a physics engine. Here, examples of the recording medium 156 include, for example, a magnetic recording medium such as a hard disk and a nonvolatile memory such as an electrically erasable and programmable read only memory (EEPROM), a flash memory, a magnetoresistive random access memory (MRAM), a ferroelectric random access memory (FeRAM), and a phase change random access memory (PRAM). However, the examples of the recording medium 156 are not limited thereto.

The input/output interface 158 connects, for example, the operation input device 160 to the display device 162. Here, examples of the input/output interface 158 include, for example, a universal serial bus (USB) port, a digital visual interface (DVI) port, a high-definition multimedia interface (HDMI) port, and various processing circuits. However, the examples of the input/output interface 158 are not limited thereto. Here, as a matter of course, the input/output interface 158 can also be connected to an operation input device (for example, a keyboard and a mouse) as an external apparatus of the information processing apparatus 100 and to a display device (for example, an external display).

The operation input device 160 functions as an operation unit (not shown). Moreover, the operation input device 160 is included in, for example, the information processing apparatus 100 and connected to the input/output interface 158 in the information processing apparatus 100. Examples of the operation input device 160 include, for example, a button, a direction key, and a rotational selector such as a jog dial, and a combination of these items. However, the examples of the operation input device 160 are not limited thereto.

The display device 162 and the electrostatic touch panel 164 function as the operation display unit 102. The display device 162 is included in, for example, the information processing apparatus 100, and connected to the input/output interface 158 in the information processing apparatus 100. Examples of the display device 162 include, for example, a liquid crystal display (LCD) and an organic electroluminescence display (which may also be called an organic light-emitting diode (OLED) display). However, the examples of the display device 162 are not limited thereto.

Moreover, the display device 162 is provided with the electrostatic touch panels 164, which can detect one or more touch operations performed by a user. A structure including the display device 162 and the electrostatic touch panel 164 can realize a touch screen according to an embodiment of the present invention, which can display virtual operation keys and the like and detect a user operation.

The communication interface 166 is communication means included in the information processing apparatus 100, and functions as a communication unit (not shown) that performs communication via a network (or directly) to and from an external apparatus in a wired or wireless manner. Here, examples of the communication interface 166 include, for example, a communication antenna and a radio frequency (RF) circuit (wireless communication), an IEEE802.15.1 port and a transmission and receiving circuit (wireless communication), an IEEE802.11b port and a transmission and receiving circuit (wireless communication), and a LAN port and a transmission and receiving circuit (wired communication). However, the examples of the communication interface 166 are not limited thereto.

The information processing apparatus 100 performs the above-described (1) processing (processing for determining whether an operation has been performed on an operation target) to the (4) processing (arrangement processing) using, for example, the structure shown in FIG. 8, and realizes the approach to improve user-friendliness according to the above-described embodiment of the present invention.

Here, the hardware structure of the information processing apparatus 100 according to an embodiment of the present invention is not limited to the structure shown in FIG. 8. For example, the information processing apparatus 100 according to an embodiment of the present invention may include a touch panel of an arbitrary method that can realize a multi-touch screen, instead of the electrostatic touch panel 164.

Referring back to FIG. 7, components of the information processing apparatus 100 will be described. The operation display unit 102 displays the display screen and detects detection information based on a user operation performed on the display screen. The operation display unit 102 transfers the detected detection information to the control unit 106. Here, the above-described detection information includes, for example, a value corresponding to a change in capacitance and information regarding the coordinates of the detected position. However, the information (data) included in the detection information is not limited thereto.

Moreover, the information processing apparatus 100 includes, for example, the operation display unit 102 that includes the display device 162 and the electrostatic touch panel 164. However, what the information processing apparatus 100 includes is not limited thereto.

The storage unit 104 is storage means included in the information processing apparatus 100. Here, examples of the storage unit 104 include, for example, a magnetic recording medium such as a hard disk and a nonvolatile memory such as a flash memory. However, the examples of the storage unit 104 are not limited thereto.

Moreover, the storage unit 104 stores, for example, various data such as display area data, content data, and various applications such as a physics engine. Here, FIG. 7 shows an example in which display area data 130 and an application 132 are stored in the storage unit 104. However, what the storage unit 104 stores is not limited thereto.

The control unit 106 includes, for example, a MPU and an integrated circuit on which various processing circuits are integrated, and plays a role of controlling the whole information processing apparatus 100. Moreover, the control unit 106 includes the operation determination unit 110, the image-to-be-displayed selection unit 112, the area-where-arrangement-is-not-to-be-performed setting unit 114, the arrangement processing unit 116, and the processing unit 118. The control unit 106 plays a leading role in performing the above-described (1) processing (processing for determining whether an operation has been performed on an operation target) to the (4) processing (arrangement processing). Moreover, when a user performs an operation on the display screen, the control unit 106 can perform processing corresponding to the operation since the control unit 106 has the above-described structure.

The operation determination unit 110 plays a role of performing the above-described (1) processing (processing for determining whether an operation has been performed on an operation target). More specifically, the operation determination unit 110 determines whether an operation has been performed on an operation target (an operation object) that is displayed on the display screen and that can be operated by a user, in accordance with detection information detected by the operation display unit 102. An example of the operation to be determined by the operation determination unit 110 includes, for example, an operation performed on an operation target (an operation object) such as touching/releasing of a virtual operation key. However, the example of the operation to be determined by the operation determination unit 110 is not limited thereto. The following will describe, as an example, a case in which the operation determination unit 110 determines whether an operation has been performed on a "virtual operation key" as an operation target.

Moreover, the operation determination unit 110 further determines whether, for example, a virtual operation key which has been determined to be a virtual operation key on which an operation has been detected is a predetermined virtual operation key (for example, a parent button, a virtual operation key corresponding to a main menu, or the like) related to another virtual operation key.

Then, the operation determination unit 110 transfers the determination results to the image-to-be-displayed selection unit 112, the area-where-arrangement-is-not-to-be-performed setting unit 114, the arrangement processing unit 116, and the processing unit 118. Here, the operation determination unit 110 transfers the determination results including, for example, the fact that an operation has been performed on a virtual operation key and information for specifying the virtual operation key (for example, information such as an ID of the virtual operation key). However, the determination results are not limited thereto.

Here, the operation determination unit 110 can transfer determination results to the various units every time a determination is made. However, the units to which the operation determination unit 110 transfers determination results are not limited thereto. For example, the operation determination unit 110 may also transfer determination results to selected units. As an example of transfer of determination results to selected units, if it is determined that, for example, an operation has been performed on the above-described predetermined virtual operation key, the operation determination unit 110 may select the image-to-be-displayed selection unit 112, the area-where-arrangement-is-not-to-be-performed setting unit 114, and the arrangement processing unit 116, and send determination results to them. However, the units to which the operation determination unit 110 transfers determination results are not limited thereto. Moreover, the operation determination unit 110 may also select the processing unit 118 and send determination results to the processing unit 118 as results of determinations made in steps S108, S110, and S114 shown in FIG. 5.

As described above, since the operation determination unit 110 selects units and transfers determination results to the units, the units that receive the determination results can perform processing in accordance with the received determination results. Here, in a case in which the operation determination unit 110 transfers determination results to units every time a determination is made, as a matter of course, the units that receive the determination results can determine, for example, whether to perform processing. The following will describe, as an example, a case in which the operation determination unit 110 selects units and transfers determination results to the units.

The image-to-be-displayed selection unit 112 plays a role of performing the above-described (2) processing (processing for selecting images to be displayed). More specifically, the image-to-be-displayed selection unit 112 selects images to be displayed (objects to be displayed) related to the predetermined virtual operation key, in accordance with, for example, a determination result that is transferred from the operation determination unit 110 and that indicates that an operation has been performed on the above-described predetermined virtual operation key.

Moreover, the image-to-be-displayed selection unit 112 transfers information regarding the selected images to be displayed to the arrangement processing unit 116.

The area-where-arrangement-is-not-to-be-performed setting unit 114 plays a role of performing the above-described (3) processing (processing for setting an area where arrangement is not to be performed). More specifically, the area-where-arrangement-is-not-to-be-performed setting unit 114 sets an area where arrangement is not to be performed, in accordance with the determination result that is transferred from the operation determination unit 110 and that indicates that an operation has been performed on the predetermined virtual operation key and the detection information that is transferred from the operation display unit 102.

Moreover, the area-where-arrangement-is-not-to-be-performed setting unit 114 transfers information regarding the set area where arrangement is not to be performed to the arrangement processing unit 116.

The arrangement processing unit 116 plays a role of performing the above-described (4) processing (arrangement processing). More specifically, the arrangement processing unit 116 arranges the images to be displayed in an area where arrangement can be performed, in accordance with the information regarding the images to be displayed transferred from the image-to-be-displayed selection unit 112 and the information regarding the area where arrangement is not to be performed transferred from the area-where-arrangement-is-not-to-be-performed setting unit 114.

The control unit 106 includes the operation determination unit 110, the image-to-be-displayed selection unit 112, the area-where-arrangement-is-not-to-be-performed setting unit 114, and the arrangement processing unit 116, and thus the control unit 106 can play a leading role in performing the above-described (1) processing (processing for determining whether an operation has been performed on an operation target) to the (4) processing (arrangement processing).

In accordance with the determination result transferred from the operation determination unit 110, the processing unit 118 executes processing allocated to the virtual operation key corresponding to the determination result.

The control unit 106 further includes the processing unit 118. Thus, when a user performs an operation on the display screen, the control unit 106 can perform processing corresponding to the operation.

The information processing apparatus 100 realizes the above-described (1) processing (processing for determining whether an operation has been performed on an operation target) to the (4) processing (arrangement processing) using, for example, the structure shown in FIG. 7. Thus, the information processing apparatus 100 can provide improved user-friendliness for users who use an information processing apparatus including a device that can display a display screen and that allows a user operation to be performed on the display screen. Here, as a matter of course, the structure of an information processing apparatus according to an embodiment of the present invention is not limited to the structure shown in FIG. 7.

As described above, the information processing apparatus 100 according to an embodiment of the present invention detects detection information regarding a user operation at the operation display unit 102, and performs the above-described (1) processing (processing for determining whether an operation has been performed on an operation target) to the (4) processing (arrangement processing) in accordance with the detection result. The information processing apparatus 100 can realize "displaying of child buttons related to a parent button in such a way that the child buttons are not displayed under a user's finger used to touch the parent button" as shown in, for example, FIG. 1C by performing the above-described (1) processing (processing for determining whether an operation has been performed on an operation target) to the (4) processing (arrangement processing). Here, the child buttons displayed on the display screen are not displayed in such a way that, for example, the child buttons are hidden under the user's finger. As shown in, for example, FIG. 1D, the view of the child buttons is not blocked by the user's finger that touched the parent button, so that the user can easily touch a child button. Thus, the information processing apparatus 100 can prevent a case in which selection of the above-described options may be troublesome and which may happen in an (existing) information processing apparatus having a touch screen. Thus, the information processing apparatus 100 can improve user-friendliness. Moreover, the information processing apparatus 100 allows a touch operation to be performed on the touch screen TS as shown in FIGS. 1A to 1D, and thereby the information processing apparatus 100 still has an advantage of "enabling a user to more intuitively perform an operation" unlike an existing information processing apparatus to which existing technologies have been applied. Thus, the user-friendliness of the information processing apparatus 100 can be improved to be greater than that of an existing information processing apparatus to which existing technologies have been applied. Thus, the information processing apparatus 100 can provide improved user-friendliness for users who use an information processing apparatus including a device that can display a display screen and that allows a user operation to be performed on the display screen.

In the above, the information processing apparatus 100 has been described, as an example, as an embodiment of the present invention. However, the embodiment of the present invention is not limited thereto. Embodiments of the present invention may be applied to various apparatuses such as a personal computer (PC), a computer such as a note PC, portable communication devices such as a cell phone and a personal handyphone system (PHS) phone, a video/audio playback apparatus (or a video/audio recording/playback apparatus), a portable game machine, an ATM, and a television that can receive digital broadcasting/analog broadcasting.

A Program According to an Information Processing Apparatus According to an Embodiment of the Present Invention A program that causes a computer to function as an information processing apparatus according to an embodiment of the present invention can provide improved user-friendliness for users who use an information processing apparatus including a device that can display a display screen and that allows a user operation to be performed on the display screen.

In the above, favorable embodiments of the present invention have been described with reference to the attached drawings. However, as a matter of course, the favorable embodiments of the present invention are not limited to the examples in the embodiments of the present invention. Various variations and modifications within the scope of the appended claims will be apparent to those skilled in the art. Thus, as a matter of course, such variations and modifications also fall within the technical scope of the present invention.

For example, in the information processing apparatus 100 shown in FIG. 7, the structure of the control unit 106 is shown that includes the operation determination unit 110, the image-to-be-displayed selection unit 112, the area-where-arrangement-is-not-to-be-performed setting unit 114, the arrangement processing unit 116, and the processing unit 118. However, the structure of an information processing apparatus according to an embodiment of the present invention is not limited thereto. For example, an information processing apparatus according to an embodiment of the present invention may also include the operation determination unit 110, the image-to-be-displayed selection unit 112, the area-where-arrangement-is-not-to-be-performed setting unit 114, the arrangement processing unit 116, and the processing unit 118 individually (for example, each of the units may be realized as an individual circuit).

Moreover, in the above, it is described that a program (a computer program) that causes a computer to function as an information processing apparatus according to an embodiment of the present invention is provided. Furthermore, according to an embodiment of the present invention, a storage medium on which the program is stored can also be provided in addition to the program.

The above-described structure is an example of an embodiment of the present invention and, as a matter of course, falls within the technical scope of the present invention.

The present application contains subject matter related to that disclosed in Japanese Priority Patent Application JP 2009-147505 filed in the Japan Patent Office on Jun. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    an operation display unit that displays a display screen and detects detection information that changes in accordance with a user operation performed on the display screen;
    an operation determination unit that determines, in accordance with the detection information, whether an operation has been performed on an operation target that can be operated by a user and that is displayed on the display screen;
    an image-to-be-displayed selection unit that selects an image to be displayed as another operable target that is to be displayed on the display screen, in accordance with a determination result from the operation determination unit, wherein the image to be displayed is not displayed on the display screen prior to the operation being performed on the operation target;
    an area-where-arrangement-is-not-to-be-performed setting unit that sets an area where arrangement is not to be performed, the image to be displayed being not to be arranged in the area where arrangement is not to be performed, on the display screen in accordance with the determination result from the operation determination unit and the detection information; and
    an arrangement processing unit that arranges the image to be displayed, in an area where arrangement can be performed, the image to be displayed being allowed to be arranged in the area where arrangement can be performed, within the display screen in accordance with the selected image to be displayed and the set area where arrangement is not to be performed,
    wherein the detection information comprises information on a touch-detected area of the display screen in which a contact made by an operating member is detected upon the display screen,
    wherein the area-where-arrangement-is-not-to-be-performed setting unit sets the area where arrangement is not to be performed to include an area of the display screen corresponding to the touch-detected area,
    wherein the operation determination unit further determines, in accordance with detection information, whether a further operation is performed upon the another operable target prior to an end of the operation performed on the operation target, and a processing associated with the another operable target is executed upon the determination that the further operation is performed upon the another operable target prior to the end of the operation performed on the operation target, and
    wherein, when the operation determination unit determines that the operation performed on the operation target has ended with no further operation having been performed upon the another operable target and the ending of the operation is still associated with the operation target, a processing associated with the operation target is executed.

2. The information processing apparatus according to claim 1, wherein the arrangement processing unit sets the area where arrangement can be performed, in accordance with the set area where arrangement is not to be performed and a display area where the image to be displayed can be displayed within the display screen.

3. The information processing apparatus according to claim 2, wherein the area-where-arrangement-is-not-to-be-performed setting unit updates the set area where arrangement is not to be performed, every time an image to be displayed is arranged by the arrangement processing unit, and the arrangement processing unit sets the area where arrangement can be performed, in accordance with the updated area where arrangement is not to be performed.

4. The information processing apparatus according to claim 3, wherein the arrangement processing unit sets a direction of attraction based on the detection information, and a display start position where display of the image to be displayed starts, and arranges the image to be displayed selected by the image-to-be-displayed selection unit, from the display start position in the direction of attraction.

5. The information processing apparatus according to claim 1, wherein in a case in which the operation determination unit determines that an operation has been performed on a predetermined operation target, the image-to-be-displayed selection unit selects, as the image to be displayed, another operation target that can be operated by a user and that is related to the predetermined operation target.

6. The information processing apparatus according to claim 1, further comprising a processing unit that performs, in accordance with the determination result from the operation determination unit, processing that corresponds to the operation target, the operation determination unit having determined that an operation has been performed on the operation target.

7. A method for controlling display, comprising the steps of:
determining, in accordance with detection information detected by an operation determination unit that displays a display screen and detects detection information that changes in accordance with a user operation performed on the display screen, whether an operation has been performed on an operation target that can be operated by a user and that is displayed on the display screen;
selecting an image to be displayed as another operable target that is to be displayed on the display screen, in accordance with a determination result in the step of determining, wherein the image to be displayed is not displayed on the display screen prior to the operation being performed on the operation target;
setting an area where arrangement is not to be performed, the image to be displayed being not to be arranged in the area where arrangement is not to be performed, on the display screen in accordance with the determination result in the step of determining and the detection information;
arranging the image to be displayed, in an area where arrangement can be performed, the image to be displayed being allowed to be arranged in the area where arrangement can be performed, within the display screen in accordance with the image to be displayed selected in the step of selecting and the area where arrangement is not to be performed set in the step of setting;
determining, in accordance with detection information, whether a further operation is performed upon the another operable target prior to an end of the operation performed on the operation target, and a processing associated with the another operable target is executed upon the determination that the further operation is performed upon the another operable target prior to the end of the operation performed on the operation target, and
executing, when the operation performed on the operation target is determined to have ended with no further operation having been performed upon the another operable target and the ending of the operation is still associated with the operation target, a processing associated with the operation target,
wherein the detection information comprises information on a touch-detected area of the display screen in which a contact made by an operating member is detected upon the display screen, and
wherein the area where arrangement is not to be performed is set to include an area of the display screen corresponding to the touch-detected area.

8. A non-transitory computer-readable recording medium having a program recorded therein, the program comprising the steps of:
determining, in accordance with detection information detected by an operation determination unit that displays a display screen and detects detection information that changes in accordance with a user operation performed on the display screen, whether an operation has been performed on an operation target that can be operated by a user and that is displayed on the display screen;
selecting an image to be displayed as another operable target that is to be displayed on the display screen, in accordance with a determination result in the step of determining, wherein the image to be displayed is not displayed on the display screen prior to the operation being performed on the operation target;
setting an area where arrangement is not to be performed, the image to be displayed being not to be arranged in the area where arrangement is not to be performed, on the display screen in accordance with the determination result in the step of determining and the detection information;
arranging the image to be displayed, in an area where arrangement can be performed, the image to be displayed being allowed to be arranged in the area where arrangement can be performed, within the display screen in accordance with the image to be displayed selected in the step of selecting and the area where arrangement is not to be performed set in the step of setting;
determining, in accordance with detection information, whether a further operation is performed upon the another operable target prior to an end of the operation performed on the operation target, and a processing associated with the another operable target is executed upon the determination that the further operation is performed upon the another operable target prior to the end of the operation performed on the operation target, and
executing, when the operation performed on the operation target is determined to have ended with no further operation having been performed upon the another operable target and the ending of the operation is still associated with the operation target, a processing associated with the operation target,
wherein the detection information comprises information on a touch-detected area of the display screen in which a contact made by an operating member is detected upon the display screen, and
wherein the area where arrangement is not to be performed is set to include an area of the display screen corresponding to the touch-detected area.

9. The method according to claim 7, wherein the step of arranging the image to be displayed sets the area where arrangement can be performed, in accordance with the set area where arrangement is not to be performed and a display area where the image to be displayed can be displayed within the display screen.

10. The method according to claim 9, wherein the step of setting an area where arrangement is not to be performed updates the set area where arrangement is not to be performed, every time an image to be displayed is arranged by the arrangement processing unit, and the arrangement processing unit sets the area where arrangement can be performed, in accordance with the updated area where arrangement is not to be performed.

11. The method according to claim 10, wherein the step of arranging the image to be displayed sets a direction of attraction based on the detection information, and a display start position where display of the image to be displayed starts, and arranges the image to be displayed selected by the image-to-be-displayed selection unit, from the display start position in the direction of attraction.

12. The method according to claim 9, wherein in a case in which the operation determination unit determines that an operation has been performed on a predetermined operation target, the step of arranging the image to be displayed selects, as the image to be displayed, another operation target that can be operated by a user and that is related to the predetermined operation target.

13. The medium according to claim 8, wherein the step of arranging the image to be displayed sets the area where arrangement can be performed, in accordance with the set area where arrangement is not to be performed and a display area where the image to be displayed can be displayed within the display screen.

14. The medium according to claim 13, wherein the step of setting an area where arrangement is not to be performed updates the set area where arrangement is not to be performed, every time an image to be displayed is arranged by the arrangement processing unit, and the arrangement processing unit sets the area where arrangement can be performed, in accordance with the updated area where arrangement is not to be performed.

15. The medium according to claim 14, wherein the step of arranging the image to be displayed sets a direction of attraction based on the detection information, and a display start position where display of the image to be displayed starts, and arranges the image to be displayed selected by the image-to-be-displayed selection unit, from the display start position in the direction of attraction.

16. The medium according to claim 13, wherein in a case in which the operation determination unit determines that an operation has been performed on a predetermined operation target, the step of arranging the image to be displayed selects, as the image to be displayed, another operation target that can be operated by a user and that is related to the predetermined operation target.

17. The information processing apparatus according to claim 1, wherein the image is selected based on a look-up table in which the operation target corresponds to a piece of information specifying the image to be displayed.

18. The information processing apparatus according to claim 1, wherein the detection information further comprises information on a proximity-detected area of the display screen in which the operating member is detected to be in proximity to the display screen, and
wherein the area-where-arrangement-is-not-to-be-performed setting unit sets the area where arrangement is not to be performed to further include an area of the display screen corresponding to the proximity-detected area.

19. The information processing apparatus according to claim 18, wherein the area-where-arrangement-is-not-to-be-performed setting unit sets the area where arrangement is not to be performed to further include an area of the display screen where the operation target is arranged.

20. The information processing apparatus according to claim 18, wherein the area-where-arrangement-is-not-to-be-performed setting unit sets the area where arrangement is not to be performed as an oriented bounding box corresponding to a combined area of the area of the display screen corresponding to the touch-detected area and the area of the display screen corresponding to the proximity-detected area.

21. The information processing apparatus according to claim 1, wherein all operable targets that are displayed on the display screen after the operation has been performed on the operation target, except for the operation target but including the image to be displayed, are arranged to be displayed outside of the set area where arrangement is not to be performed.

22. The information processing apparatus according to claim 18, wherein all operable targets that are displayed on the display screen after the operation has been performed on the operation target, except for the operation target but including the image to be displayed, are arranged to be displayed outside of the set area where arrangement is not to be performed.

* * * * *